United States Patent [19]
Blatt

[11] 3,866,485
[45] Feb. 18, 1975

[54] ANGULAR ADJUSTMENT MOUNT FOR A WORKPIECE EXTRACTOR

[76] Inventor: Leland F. Blatt, 31915 Grolsbeck, Grosse Pointe Shores, Mich. 48026

[22] Filed: Oct. 3, 1973

[21] Appl. No.: 403,034

[52] U.S. Cl. ................................ 74/422, 74/29
[51] Int. Cl. .......................................... F16h 1/04
[58] Field of Search .......... 214/147 T, 1 BD, 1 BV; 74/29, 30, 422

[56]  References Cited
   UNITED STATES PATENTS

| | | | |
|---|---|---|---|
| 2,101,830 | 12/1937 | Babcock | 74/422 |
| 2,338,271 | 1/1944 | Ulanet | 74/422 |
| 2,467,066 | 4/1949 | Wilson | 74/422 |
| 3,613,904 | 9/1969 | Blatt | 214/1 BV |

*Primary Examiner*—Samuel Scott
*Assistant Examiner*—Wesley S. Ratliff, Jr.
*Attorney, Agent, or Firm*—Cullen, Settle, Sloman & Cantor

[57] ABSTRACT

An angular adjustment mount for a workpiece extractor includes a support plate adapted for mounting upon the reciprocal carriage of a shuttle unit. The support plate mounts a pair of spaced depending hanger plates which pivotally mount there between a hanger mount for angular adjustment. Transverse longitudinal bore through the hanger mount adjacent its lower end is adapted to supportably receive a hanger rod of a workpiece gripping jaw support. The means for effecting the angular adjustment for a hanger mount with respect to the hanger plates, includes a rack pinion on the angular mount and a transversely adjustable rack gear upon said hanger plates to mesh with said opinion. Means are provided for adjusting the rack gear relative to said pinion; and further means are included for securing the rack in such adjusted position.

4 Claims, 4 Drawing Figures

ANGULAR ADJUSTMENT MOUNT FOR A WORKPIECE EXTRACTOR

BACKGROUND OF THE INVENTION

Heretofore there have been provided reciprocal carriages for a shuttle which are adapted to supportably mount either a workpiece gripping jaw or an actuating unit supporting a workpiece gripper. Such construction is shown in my U.S. Pat. No. 3,665,771.

Heretofore, there have been various improvements in workpiece gripping jaws such as shown in my U.S. Pat. No. 3,714,870.

Also there have been improvements in actuating units and supporting units for the gripper head assembly for the purpose of feeding the gripper head to a position with respect to a press for example, for loading and unloading a workpiece and for retracting such workpiece such as shown in my U.S. Pat. No. 3,371,583.

Heretofore furthermore, in conjunction with power operated reciprocal shuttle units, or the use of overhead arms in mounting a reciprocal carriage, certain flexible means have been employed depending from such carriage by which the jaw or the gripper head and its actuating unit are supportably suspended in such manner as to provide for adjustment and positioning of the jaw and actuating unit in the initial setup such as in my U.S. Pat. No. 3,080,983.

BRIEF DESCRIPTION OF THE INVENTION

It is an object of the present invention to provide an improved angular adjustment mount for a workpiece extractor assembly, wherein there is provided a body assembly which is adjustably and supportably mounted upon the reciprocal carriage of an extractor unit. It is a further object to provide an angular adjustment mounting for the body assembly relative to the carriage in a first plane at right angles to the direction of reciprocal movement of the shuttle.

It is another object of the present invention to provide in conjunction with such body assembly a hanger mount which is pivotally mounted upon and angularly adjustable with respect to the said body assembly for angular adjustment in a plane at right angles to said first mentioned plane.

It is a further object of the present invention to provide an improved angular adjustment mount adjustably mounted upon and supported and depending from the carriage of a reciprocal shuttle unit in which through its further angularly adjustable hanger mount is provided a means of angularly adjusting and supporting the hanger bar of a actuating unit and associated workpiece gripper head. These and other objects will be seen from the following specification and claims in conjunction with the appended drawings in which:

It will be understood that the above drawings illustrate merely a preferred embodiment of the invention, and that other embodiments are contemplated within the scope of the claims, hereafter set forth.

DETAILED DESCRIPTION OF THE INVENTION

Figure 1:
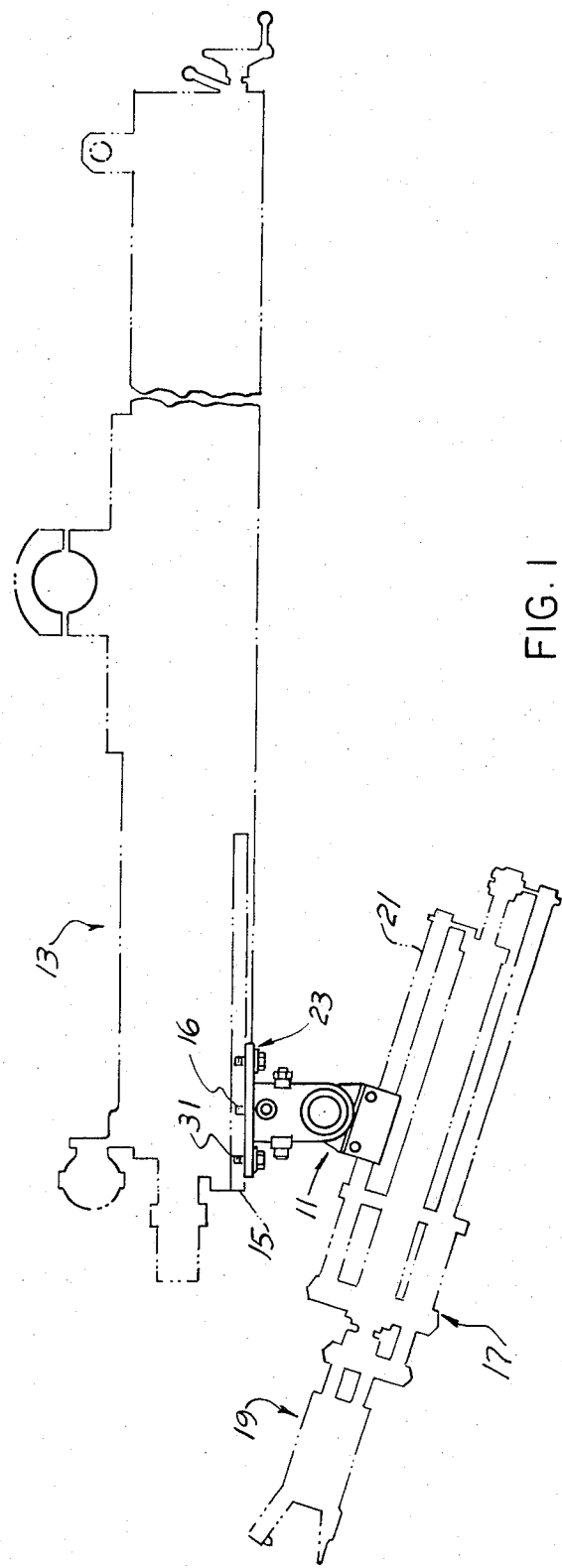
FIG. 1 is a side elevational view of the present angular adjusting mount illustrating in phantom lines mounting of the body assembly with respect to the carriage shuttle unit and further showing a hanger rod mounting of an actuating unit and gripper head upon the angularly adjustable hanger mount.
Figure 2:
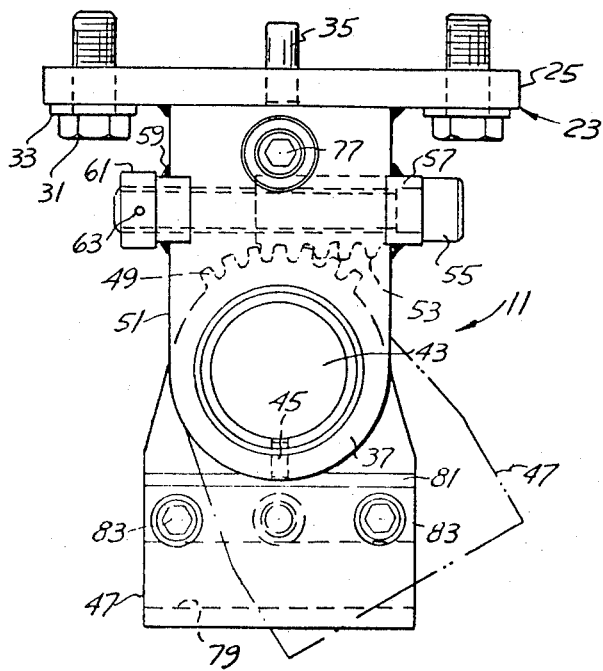
FIG. 2 is a side elevational view upon a increased scale corresponding to FIG. 1 of the present angular adjustment mount.

Referring to the drawings, the present angular adjustment mount for a workpiece extractor assembly is generally indicated at a 11, FIGS. 1 and 2. FIG. 1 schematically shows a portion of the shuttle unit 13 which mounts a reciprocal carriage 15 from which depends the present angular adjustment mount.

The present adjustment mount also supports as shown in phantom and fragmentarily in FIG. 1, the hanger mount bar 21 for the actuating unit 17 mounting worpiece gripper head 19. This shows the relationship of the present angular adjustment mount with respect to such shuttle and the actuating unit and workpiece gripper head supported thereby.

Figure 3:
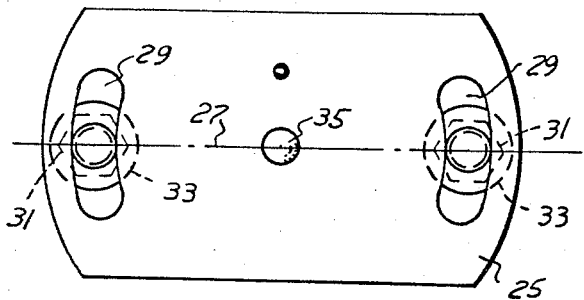
FIG. 3 is a plan view thereof.
Figure 4:
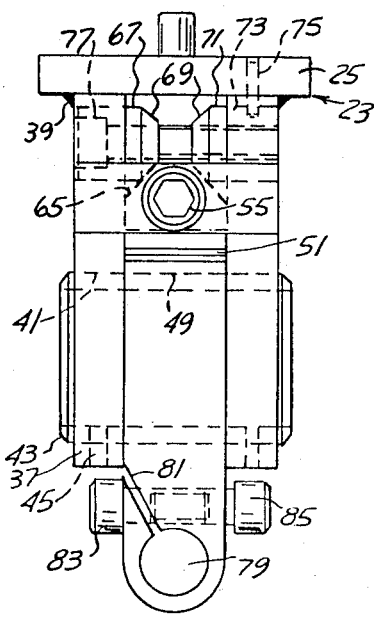
FIG. 4 is a right end elevational view thereof.

The present invention is particularly directed to the angular adjustment mount shown in further detail and on an increased scale, FIGS. 2, 3 and 4. Said angular adjustment mount includes the body assembly 23 having an elongated support plate 25. In the plan view, its center line is designated at 27 and from which projects the center pin 35.

The pair of arcuate slots 29 are arranged on opposite sides of the center pin, concentric therewith and are adapted to receive the body scres 31 with associated washers 33 adapted to be threaded into corresponding apertures in the reciprocal carriage 15, FIG. 1. The opposed arcuate slots 29 provide a means by which said support plate 25 may be angularly adjusted in a first plane through an arc of 15 or more degrees on both sides of said center line and for securing in any such desired angular position.

The present body assembly includes the opposed pair of spaced hanger plates 37 which are secured to support plate 25 such as by the welds 39. On lower portions of said support plates are the opposed aligned bores 41 through which projects the transverse center tube 43 suitably anchored by lock pins 45.

The hanger mount 47 is guideably and swivelly positioned between hanger plates 37 with its transverse bore 49 positioned over and receiving the center tube. A rack pinion segment 51 is arranged at the upper end of the hanger mount 47 on a center which corresponds to the center tube 43.

The longitudinally extending adjusting rack gear 53 is in mesh with pinion 51 and is supported upon the longitudinal rack adjusting screw 55 which is journaled through corresponding apertures in the transverse journal block plates 57. These span the hanger plates 37 from their opposite sides and are secured thereto by welds 59.

The rack adjusting screw 55 threadably engages rack gear 53 so that on manual rotation of the rack adjusting screw there will be relative movement of the rack with respect to pinion 51 causing an angularly adjustment of hanger mount 47, such as to the dotted line position shown in FIG. 2.

The rack adjustment screw is loosely journaled through blocks 57 and on one end receives the adjusting screw nut 61 which is drawn up and secured in position by transverse lock pin 63. Upper opposed side portions of the rack gear are tapered upwardly and inwardly upon the opposite sides thereof as at 65, FIG. 4.

A means are provided for locking the rack in any desired adjusted position. For this purpose there is provided a rack lock plug 67, FIG. 4, which extends through one of the hanger plates adjacent its upper end and projects inwardly thereof, and includes a similarly tapered end portion 69. This is adapted for cooperative sliding registry with the corresponding tapered wall 65 of said rack gear.

Second rack lock threaded plug 71 is oppositely arranged from plug 67 and is slideably mounted and projects through the other of said hanger plates. Its inner end portion is similarly tapered at 69 adapted for cooperative registry to the corresponding outer tapered wall portion 65 of the rack gear. Locking plug 71 is constrained against rotation through the plug guide pin 75 which is anchored through plate 25 extends down into the longitudinal slot 73 in said plug. Rack lock screw 77 is nested and retained within plug 67 and is adjustably threaded through the rack lock threaded plug 71.

Accordingly, once the hanger mount 47 has been adjusted to the desired angular position, such as shown in dotted lines in FIG. 2, and as shown in FIG. 1, it may be locked in such position by manual adjustment of the locking screw 77. This causes plug 73 to operatively and frictionaly engage said rack gear in such manner as to retain said rack gear against undesired longitudinal adjustment.

Across the free end of the hanger mount, there is a elongated transverse bore 79 which is adapted to supportably receive the hanger rod 21 for the actuating unit shown in FIG. 1.

The angular transverse slot 81 extends through corresponding portion of the hanger mount so as to register with bore 79 to thus provide a yieldable portion on said hanger mount to facilitate assembly of the hanger rod 21 with respect to the hanger mount.

Once the hanger rod has been longitudinally adjusted as desired, with respect to the hanger mount it is secured in such adjusted position by the pair of adjustment mounting screws 83 which extend through the slit portion of the hanger mount and threadably engage the other portion thereof to draw up the slit portion into snug frictional retaining engagemeent with the hanger bar. To facilitate this, there is provided the adjustable stop screw 85 which extends inwardly of the hanger mount in the opposite direction.

By the present construction, there has been provided a simplified and very convenient angular adjustment mount which is suspended from the reciprocal carriage of the shuttle and which can be angularly adjusted in a first plane secured by fasteners 31.

The hanger rod 21 of the actuating unit 17 and workpiece gripper head 19, may be additionally longitudinally adjusted with respect to said hanger mount and secured in position by the fasteners 83. Thereafter, there can be a further angular adjustment of the hanger mount 47 by rotation of the adjusting screw 55 for effecting longitudinal movements of rack gear 53 with respect to the pinion 51. This achieves the desired angle the adjustment in the range of 30 or 45 degrees from both sides of center, FIG. 2.

Thereafter, the hanger mount may be secured to such adjusted position by blocks 67 and 71 on adjustment of the control locking screw 77.

Having described my invention, reference should now be had to the following claims:

1. An angular adjustment mount for a workpiece extractor comprising a body assembly including a support plate adapted for mounting upon the reciprocal carriage of a shuttle unit, and a pair of spaced hanger plates secured thereto and depending therefrom;
    a tube spanning and extending through corresponding opposed apertures in said hanger plates and secured thereto;
    a hanger mount having a transverse bore mounted over and receiving said tube, pivotally mounted thereon and interposed between and depending from said hanger plates;
    there being a longitudinal bore through said hanger mount at one end adapted to supportably receive and mount the hanger rod of a workpiece gripping jaw support;
    there being an angular slit portion through said hanger mount extending to its bore to facilitate assembly of said hanger rod therethrough;
    fasteners extending through the slit portion of said hanger mount threadedly engaging said hanger mount for drawing up the slit portion to secure said hanger rod thereto;
    a rack pinion segment on said hanger mount concentric to its pivotal mounting;
    an adjusting rack guidably mounted upon said hanger plates in mesh with said pinion;
    means to adjust said rack relative to said pinion segment for effecting angular adjustment of said hanger mount;
    and means for securing said rack in adjusted position.

2. In the adjustment mount of claim 1, said hanger mount being adjustable in a first plane; a center pin on and projecting from said support plate adapted for nesting within an aperture in said shuttle carriage; there being a pair of opposed arcuate slots through said support plate on opposite sides of and concentric with said center pin; and fasteners projected through said slots and transversely adjustable therein, adapted for securing to said carriage, whereby said support plate is angularly adjustable with respect to said carriage, the angular adjustment of said hanger mount being in the range of 0° to 45° on both sides of center, in a second plane at right angles to said first plane.

3. In the adjustment mount of claim 1, the mounting of said adjusting rack including a pair of apertured plates mounted on opposite sides of an transversely spanning said hanger plates and secured thereto;
    a rack adjusting screw journaled through said plates and threaded through said adjusting rack;
    the means to adjust said rack including rotative adjustment of said screw;
    and an adjustment screw nut on said screw and secured thereto.

4. In the adjustment mount of claim 1, the means for securing said rack in adjusted position including an apertured rack lock plug extending through and inwardly of one of said hanger plates transversly of and bearing against one side of said rack;
    an oppositely directed interiorly threaded rack lock plug adjustably mounted on the other hanger plate adapted to operatively engage the other side of said rack;

guide means on said other hanger plate engaging and limiting the later lock plug to longitudinal movements; and a rack lock screw extending through an engaging the first lock plug and threaded into the second lock plug for drawing up the later plug into frictional retaining engagement with said rack gear.

* * * * *